US009829134B2

(12) United States Patent
Greig

(10) Patent No.: US 9,829,134 B2
(45) Date of Patent: Nov. 28, 2017

(54) SPOOLABLE SWIVEL

(71) Applicant: Halliburton Energy Services, Inc., Houston, TX (US)

(72) Inventor: Scott Robert Greig, Aberdeen (GB)

(73) Assignee: HALLIBURTON ENERGY SERVICES INC., Houston, TX (US)

( * ) Notice: Subject to any disclaimer, the term of this patent is extended or adjusted under 35 U.S.C. 154(b) by 119 days.

(21) Appl. No.: 14/653,403

(22) PCT Filed: Sep. 23, 2014

(86) PCT No.: PCT/US2014/056976
§ 371 (c)(1),
(2) Date: Jun. 18, 2015

(87) PCT Pub. No.: WO2016/048284
PCT Pub. Date: Mar. 31, 2016

(65) Prior Publication Data
US 2016/0265701 A1    Sep. 15, 2016

(51) Int. Cl.
*E21B 17/05* (2006.01)
*F16L 27/08* (2006.01)
*E21B 19/22* (2006.01)
*F16L 1/20* (2006.01)
*F16L 1/12* (2006.01)

(52) U.S. Cl.
CPC .......... *F16L 27/0816* (2013.01); *E21B 17/05* (2013.01); *E21B 19/22* (2013.01); *F16L 1/20* (2013.01); *F16C 2204/00* (2013.01); *F16L 1/12* (2013.01); *F16L 1/205* (2013.01)

(58) Field of Classification Search
CPC .. E21B 17/05; E21B 19/22; F16L 1/20; F16L 27/0816; F16L 1/12; F16L 1/205; F16L 2204/00
See application file for complete search history.

(56) References Cited

U.S. PATENT DOCUMENTS

| 3,727,950 A | 4/1973 | Swanson | |
| 4,626,003 A * | 12/1986 | Williams | ............ F16L 27/0828 277/361 |
| 4,906,137 A | 3/1990 | Maloberti et al. | |
| 5,149,148 A * | 9/1992 | Taeuber, Jr. | .......... F16L 37/148 277/322 |
| 5,538,296 A | 7/1996 | Horton | |
| 6,059,338 A | 5/2000 | Diederichs | |
| 6,164,707 A | 12/2000 | Ungchusri et al. | |
| 6,595,555 B2 * | 7/2003 | Ungchusri | .......... F16L 27/0828 285/276 |

(Continued)

OTHER PUBLICATIONS

International Search Report and Written Opinion dated Jun. 8, 2015 in International Application No. PCT/US2014/056976.

(Continued)

Primary Examiner — Benjamin F Fiorello
(74) Attorney, Agent, or Firm — Polsinelli PC

(57) ABSTRACT

A spoolable swivel, methods, and systems for coupling a first and second length of coiled tubing. The spoolable swivel can include an inner tubular element and an outer tubular element. The inner tubular element and the outer tubular element can both have dimpled distal ends and races on their proximal ends, defining one or more annular voids for swivel bearings.

25 Claims, 7 Drawing Sheets

(56) References Cited

U.S. PATENT DOCUMENTS

| | | | |
|---|---|---|---|
| 7,484,772 B2* | 2/2009 | Thorensen | F16L 13/143 285/139.2 |
| 7,637,539 B2 | 12/2009 | McKee et al. | |
| 8,402,852 B2* | 3/2013 | Klode | F16D 65/16 384/512 |
| 8,870,233 B2* | 10/2014 | Matzner | F16C 19/08 285/276 |
| 2004/0163809 A1 | 8/2004 | Mayeu et al. | |
| 2006/0034665 A1* | 2/2006 | Bryant | F16L 1/24 405/172 |
| 2006/0273588 A1* | 12/2006 | Scartozzi | F16L 19/00 285/404 |
| 2007/0000669 A1* | 1/2007 | McKee | E21B 17/02 166/380 |
| 2007/0235198 A1* | 10/2007 | Parker | E21B 17/046 166/380 |
| 2007/0295508 A1 | 12/2007 | Collins et al. | |
| 2008/0047716 A1* | 2/2008 | McKee | E21B 17/046 166/384 |
| 2011/0036557 A1 | 2/2011 | Camwell et al. | |

OTHER PUBLICATIONS

Wellvention, "Internal Dimple Type CT Connector", http://www.wellvention.com/assets/ugc/files/wv-pid-062-internal_dimple_connector.pdf, 1 Pg.

Progressive Product Marketing, "Swivel Joints", http://www.getppm.com/swiveljoints.html, 1 Pg.

Office Action; Canadian Application No. 2,897,644; dated Jan. 10, 2017.

* cited by examiner

SPOOLABLE SWIVEL

CROSS-REFERENCE TO RELATED APPLICATIONS

This application is a national stage entry of PCT/US2014/056976 filed Sep. 23, 2014, said application is expressly incorporated herein in its entirety.

FIELD

The disclosure relates generally to a spoolable swivel and more specifically to a spoolable swivel for use in conjunction with a coiled tubing downline from a marine vessel.

BACKGROUND

Attempts have been made to model or to predict the forces, such as yaw forces, applied to coiled tubing when it is submerged into the ocean for a variety of purposes, such as to provide a connection between a floating vessel and an underground pipeline or well. These models attempt to determine the useful life of such coiled tubing given the forces to which the pipe is subject as it is uncoiled into the water often to depths of 20,000 to 30,000 feet. For example, yaw is created along the longitudinal axis of the tube. Due to the enormous number of variables to be simulated, these models are often inaccurate or cost prohibitive. Additionally, as forces fatigue the pipe, often beyond the point of plastic deformation, the models often no longer apply, because the assumed mechanical properties of the pipe are no longer accurate.

BRIEF DESCRIPTION OF THE DRAWINGS

These and other features, aspects, and advantages of the present disclosure will become better understood with reference to the following description and appended claims, and accompanying drawings where:

Figure 1:
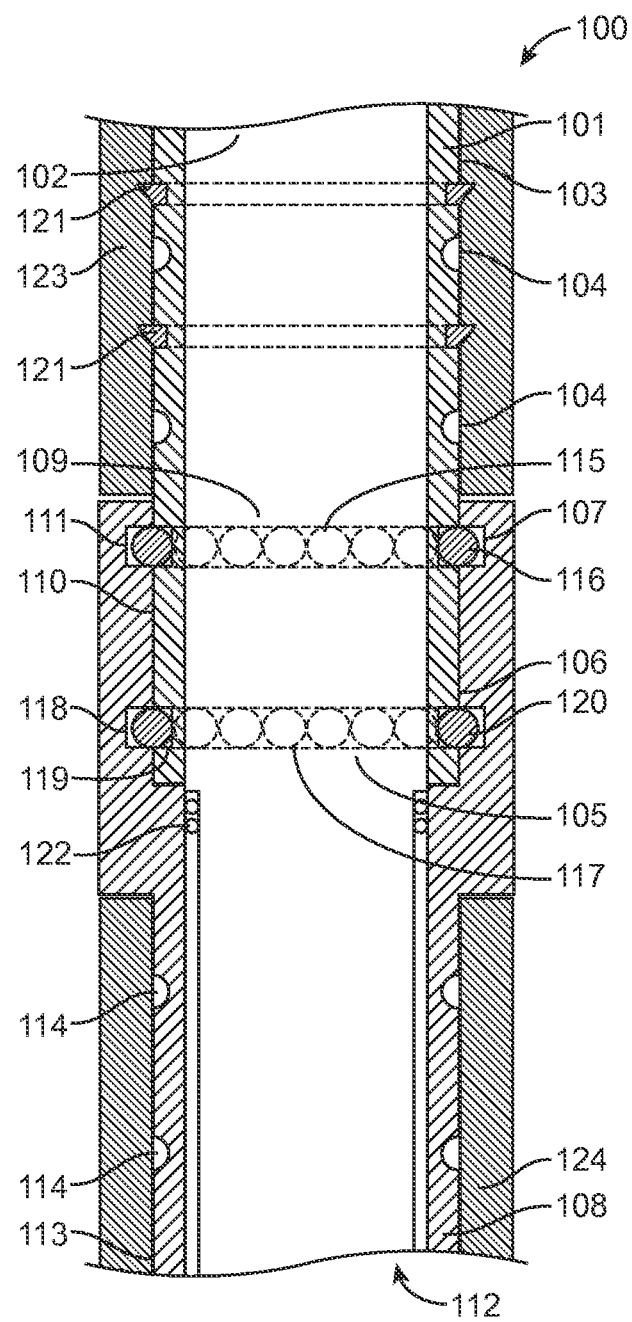
FIGS. 1 and 2 are a schematic a cross-sectional side-view illustrations of a spoolable swivel.

It should be understood that the various embodiments are not limited to the arrangements and instrumentality shown in the drawings.

DETAILED DESCRIPTION

This disclosure describes apparatus, systems, and methods for providing a coiled tubing downline from a marine vessel to a seabed with a swivel to eliminate or to reduce the need for modelling of the yaw or torsional forces on the coiled tubing. The swivel in the coiled tubing pipe may be spoolable, such that it can be moved from the coiled tubing reel without the need for splicing pipe. A spoolable swivel can also be moved through an injector head in line with the coiled tubing. The swivel assembly may have an internal dimple type connector with a bearing race to support the load and movement of the pipe. The top side (vessel side) may be free to move as the vessel rotates and the subsea side may be stationary in relation to the seabed thus eliminating the need for fatigue modelling of the yaw. Since the swivel removes the yaw, any model used should be greatly simplified and/or should last for the full predicted life of the pipe.

The present disclosure may be understood more readily by reference to the following detailed description of preferred embodiments of the disclosure as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

It should be understood that the compositions and methods are described in terms of "comprising," "containing," or "including" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

As used herein, "downline" refers to any conduit extending below sea level, for example a conduit extending from a surface vessel to an underwater well, pipeline, or vessel.

As used herein, "spoolable" means capable of being spooled or wound onto a reel.

As used herein, "wireline" refers to a cabling technology used by operators of oil and gas wells to lower equipment or measurement devices into the well for the purposes of well intervention, reservoir evaluation, and pipe recovery."

As used herein, "coiled tubing" refers to a type of spoolable pipe. The pipe is typically a metal pipe, from 1 to 3.25 inches in diameter. The spoolable pipe is typically supplied spooled onto a large reel. It can be used for interventions in oil and gas wells and sometimes as production tubing in depleted gas wells. Coiled tubing is often used to carry out operations similar to wirelining. The main benefits over wireline are the ability to pump chemicals through the coil and the ability to push it into the hole rather than relying on gravity. Pumping can be fairly self-contained, almost a closed system, since the tube is continuous instead of jointed pipe. For offshore operations, the 'footprint' for a coiled tubing operation is generally larger than a wireline spread, which can limit the number of installations where coiled tubing can be performed and make the operation more costly. A coiled tubing operation can be performed through the drilling derrick on the oil platform, which is used to support the surface equipment, although on platforms with no drilling facilities a self-supporting tower can be used instead. For coiled tubing operations on sub-sea wells a Mobile Offshore Drilling Unit (MODU) e.g. semi-submersible, Drillship, or any floating vessel can be utilized to support all the surface equipment and personnel, whereas wireline can be carried out from a smaller and cheaper intervention vessel. Onshore, they can be run using smaller service rigs, and for light operations a mobile self-contained coiled tubing rig can be used.

As used herein, "swivel" refers to a coupling between two parts enabling one to revolve without turning the other or to a mechanical element providing such a coupling. For example, a swivel can be a fastening device that allows the thing fastened to turn around freely upon it, especially to turn in a full circle, such a device can include two parts, each of which turns around independently.

As used herein, "dimple" refers to a depression or indentation in a surface. A dimple can take any shape, including but not limited to a spherical, conical, cubic, cylindrical, or polyhedral.

As used herein, "connection" refers to a coupling between two or more elements.

As used herein, "dimple connection" refers to a coupling between two or more elements involving depressing at least a portion of one element into a dimple on a surface of another element. For example, a dimple connection can be formed between a coiled tube and a surface having a plurality of dimples when one or more portions of the coiled tube are deformed into one or more of the dimples. The coiled tube can thereby be connected to the surface by mechanical and frictional forces.

As used herein, "seal" refers to a device or substance that is used to join two objects together so as to prevent, to hinder, or to restrict the two objects from coming apart and/or to prevent, to hinder, or to restrict matter from passing between the two objects. For example, a gasket is a mechanical seal which fills the space between two or more mating surfaces, generally to prevent leakage from or into the joined objects while under compression.

As used herein, "race" refers to a track or channel in which something rolls or slides. For example, a race can be a groove in which bearings, such as ball bearings or roller bearings, roll or slide. Roller bearings can take any shape, including but not limited to cylindrical.

As used herein, "tubular" means having the form of or including a tube.

As used herein, "barge" refers to any floating vessel, including but not limited to a flat-bottomed boat for carrying freight.

As used herein, "distal" means situated away from the center of the body or from the point of attachment.

As used herein, "proximal" means situated nearer to the center of the body or the point of attachment.

As used herein, "non-corrosive" means resistant to corrosion.

Referring to FIG. 1, a spoolable swivel 100 for coupling a first length of coiled tubing 123 and second length of coiled tubing 124 may include an inner tubular element 101 coupled to an outer tubular element 108. The inner tubular element may have a first distal end 102 having a first distal surface 103. A first plurality of dimples 104 may be disposed on the first distal surface 103. The inner tubular element may also have a first proximal end 105 having a first proximal surface 106. A first race 107 may be disposed on the first proximal surface 106. The outer tubular element 108 may have a second proximal end 109 having a second proximal surface 110. A second race 111 may be disposed on the second proximal surface 110. The outer tubular element 108 may have a second distal end 112 having a second distal surface 113. A second plurality of dimples 114 may be disposed on the second distal surface 113.

The first race 107 may align with the second race 111 to define an annular void 115 when the first proximal end 105 of the inner tubular element 101 is inserted into the second proximal end 109 of the outer tubular element 108. A plurality of bearings 116 may be positioned within the annular void 115 to provide a swiveling coupling between the inner tubular element 101 and the outer tubular element 108.

The spoolable swivel 101 may also include at least one additional annular void 117 defined by one or more additional races disposed on the first proximal surface 106 and on the second proximal surface 110. For example the first proximal surface 106 can include an additional race 119 and the second proximal surface 110 can include an additional race 118. At least one additional plurality of bearings 120 may be positioned within the at least one additional annular void 117 to provide the swiveling coupling between the inner tubular element 101 and the outer tubular element 108.

At least one annular lip seal 121 may be disposed on the first distal surface 103 of the inner tubular element 101. At least one ring seal 122 may bedisposed within the outer tubular element 108. The annular lip seal 121 and/or the ring seal 122 may include any suitable material, including but not limited to rubber, silicone, metal, neoprene, nitrile rubber, a polymeric material, such as polytetrafluoroethylene, and combinations thereof.

The inner tubular element 101, the outer tubular element 108, and/or any of the pluralities of bearings may include a material selected from the group consisting of a non-corrosive metal, a non-corrosive metal alloy, a rigid polymer material, and combinations thereof. The non-corrosive metal can include but is not limited to gold, platinum, aluminum, tungsten. The non-corrosive alloy can include but is not limited to steel, stainless steel, aluminum alloys, titanium alloys, copper alloys, and combinations thereof. The rigid polymer material can include but is not limited to polyacetylenes, polydiacetylenes, polyfluoroethylenes, polythiophenes, polyphenylenes, polyfluorenes, polyetherketones, polyethersulfones, polyimides, polyetherimides, polyimidazopyrrolones, copolymers thereof, and combinations thereof.

Figure 2:
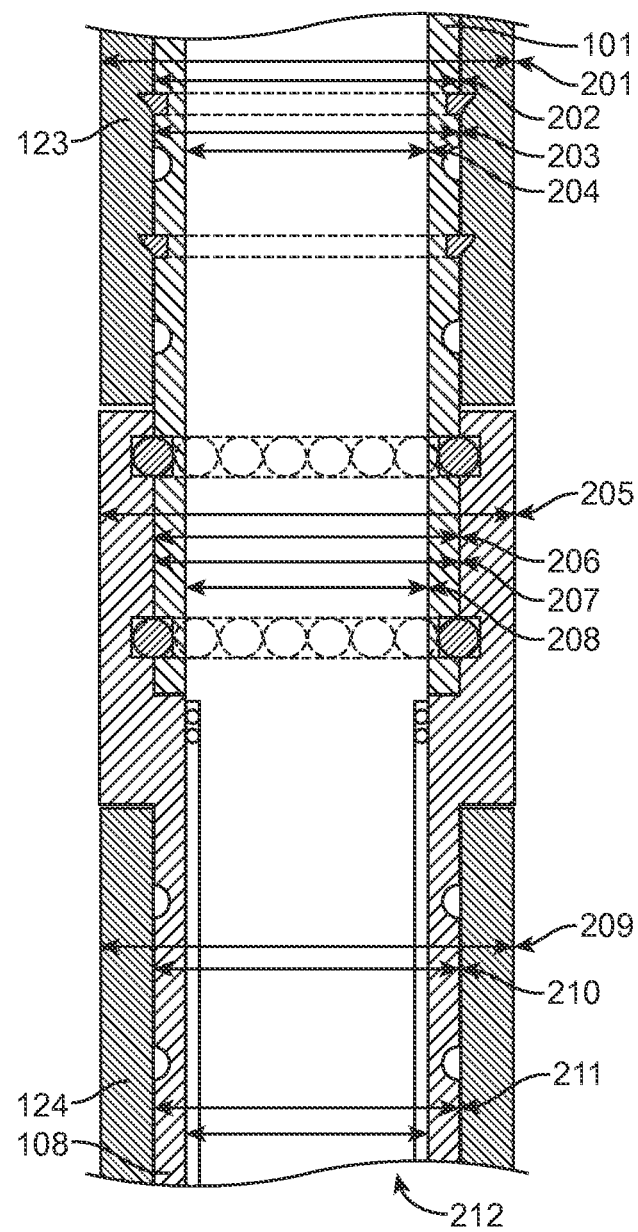

Referring to FIG. 2, the spoolable swivel 100 from FIG. 1 is illustrated again. The first distal end 102 may have a first distal inner diameter 204 and a first distal outer diameter 203. The first proximal end 105 may have a first proximal inner diameter 208 and a first proximal outer diameter 207. The second proximal end 109 may have a second proximal inner diameter 206 and a second proximal outer diameter 205. The second distal end 112 may have a second distal inner diameter 212 and a second distal outer diameter 211.

The first distal inner diameter 204, the first proximal inner diameter 208, and the second distal inner diameter 212 may be approximately equal or may vary by from 0 to 25 percent, from 5 to 20 percent, or by 10 to 15 percent. Particularly when these diameters are approximately equal, a smooth channel is provided through the spoolable swivel. The smooth channel can facilitate less turbulent and/or laminar flow of fluids through the interior of the spoolable swivel.

The first distal outer diameter 203, the first proximal outer diameter 207, the second proximal inner diameter 206, the second distal outer diameter 211 are approximately equal or may vary by from 0 to 25 percent, from 5 to 20 percent, or by 10 to 15 percent. Particularly when these diameters are approximately equal the first proximal end 105 fits well into the second proximal end 109 and the first distal end 102 and the second distal end 112 are approximately symmetrical in diameter. The symmetry can be beneficial for spooling a combination of the spoolable swivel 100 and two lengths of coiled tubing and also for passing the combination through equipment used to submerge the coiled tubing. Once the first length of coiled tubing 123 and the second length of coiled tubing 124 are secured to the first distal end 102 and the second distal end 112 respectively, the overall structure can have a consistent outer diameter, which minimizes snagging, friction, and/or bulging upon coiling the coiled tube with the spoolable swivel around a reel and other equipment.

Indeed, a difference between the second proximal outer diameter 205 and the first distal outer diameter 203 may be approximately equal to or may vary from the thickness of the first length of coiled tubing 123 by from 0 to 25 percent, from 5 to 20 percent, or by 10 to 15 percent. The thickness of the first length of coiled tubing 123 can be the difference between an outer diameter 201 and an inner diameter 202 of the first length of coiled tubing 123. Similarly, a difference between the second proximal outer diameter 205 and the second distal outer diameter 211 may be approximately equal to or may vary from a thickness of the second length of coiled tubing 124 by from 0 to 25 percent, from 5 to 20 percent, or by 10 to 15 percent. The thickness of the second length of coiled tubing 124 can be the difference between an outer diameter 209 and an inner diameter 210 of the second length of coiled tubing 124. The first length of coiled tubing 123 and/or the second length of coiled tubing 124 can have an outer diameter (201, 211) of from 0.75 to 4 inches. The thickness of the coiled tubing can vary. For example the thickness can be 0.087 inches gauge to 0.250 inches gauge.

To further ensure that the first proximal end 105 of the inner tubular element 101 fits securely into the second proximal end 109 of the outer tubular element 108, a difference between the second proximal outer diameter 205 and the second distal inner diameter 212 may be approximately equal to or may vary from a thickness of the first proximal end 105 of the inner tubular element 101 by from 0 to 25 percent, from 5 to 20 percent, or by 10 to 15 percent. The thickness of the first proximal end 105 of the inner tubular element can be the difference between the first proximal inner diameter 208 and the first proximal outer diameter 207.

A method for joining a first length of coiled tubing 123 to a second length of coiled tubing 124 can include disposing a spoolable swivel 100 as described herein between the first length of coiled tubing 123 and the second length of coiled tubing 124. More specifically, the first distal end 102 of the inner tubular element 101 may be inserted into one end of the first length of coiled tubing 123. The second distal end 112 of the outer tubular element 108 can be inserted into one end of the second length of coiled tubing 124.

Next, as illustrated in FIGS. 3A, 3B, 3C, and 3D, the first length of coiled tubing 123 can be deformed into the first plurality of dimples 104 at a plurality of points 305 along the first length of coiled tubing 123. Similarly, the second length of coiled tubing 124 can be deformed into the second plurality of dimples 114 at a plurality of points 305 along the second length of coiled tubing 124.

Figure 3A:
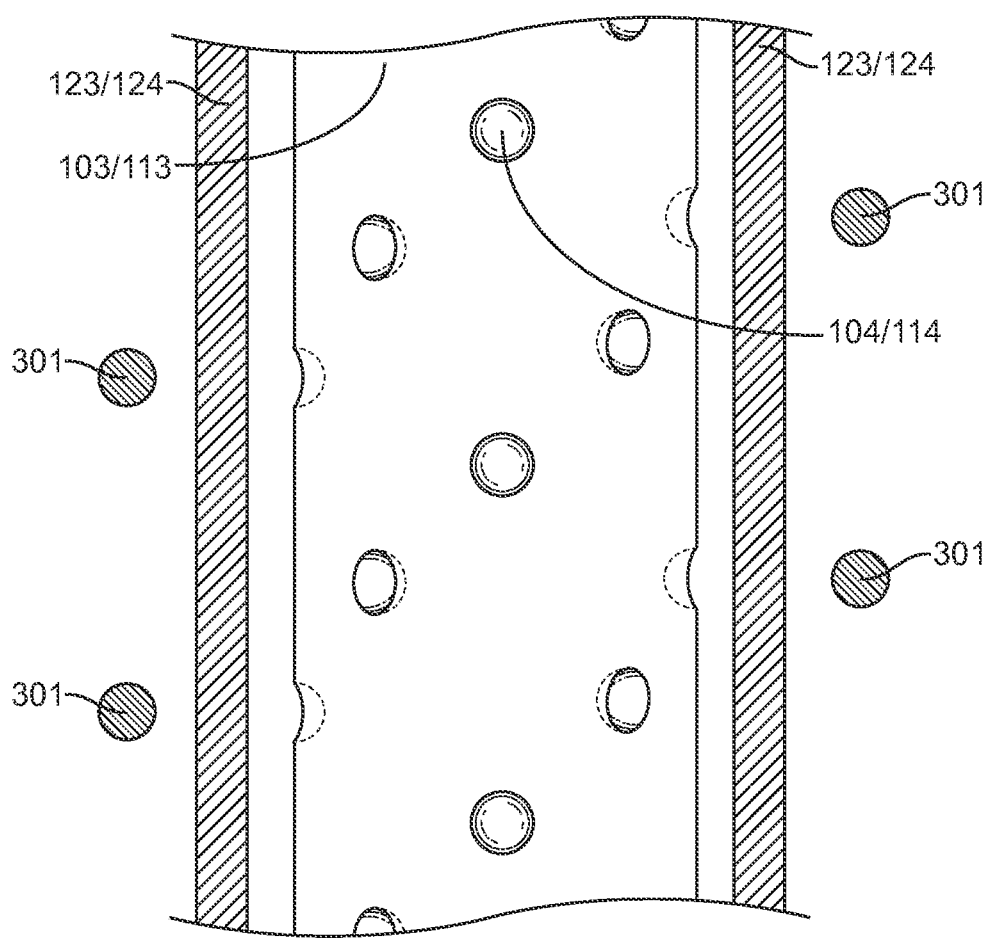
FIG. 3A-3D are a schematic side-view illustrations showing a dimple connection between a spoolable swivel and coiled tubing.

Referring to FIG. 3A, a distal end of either the inner tubular element 101 or the outer tubular element 108 is inserted inside either the first length of coiled tubing 123 or the second length of coiled tubing 124. Negative-dimple-shaped pressure elements 301 may be aligned with the dimples (104, 114) on the surface (103/113) of the distal end (101, 108). The negative-dimple-shaped pressure elements can have a shape that is the inverse or negative of the dimples. For example, if a dimple has a concave spherical shape, the negative-dimple-shaped pressure elements can have a spherical shape. As stated herein, a dimple can take any shape, including but not limited to a spherical, conical, cubic, cylindrical, or polyhedral. The negative-dimple-shaped pressure elements can take the inverse of any of these shapes or any other shape to correspond with the shape and size of the dimples. The negative-dimple-shaped pressure elements 301 may include any suitable material. Since pressure will be applied to the negative-dimple-shaped pressure elements, the material of construction must be able to withstand the pressure without significant deformation. In general, the negative-dimple-shaped pressure elements can include the same types of materials already mentioned with respect to the inner tubular element 101, the outer tubular element 108, and/or any of the pluralities of bearings.

Figure 3B:
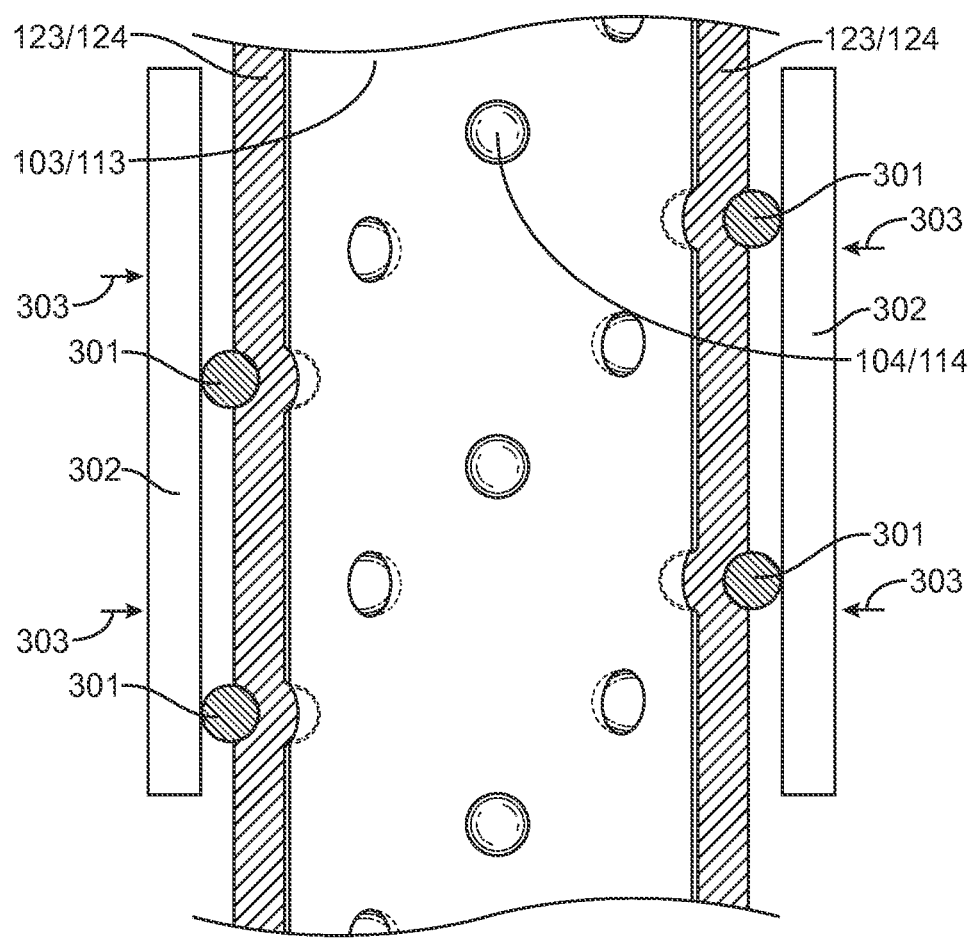

Referring to FIG. 3B, the negative-dimple-shaped pressure elements 301, are pressed against the first or second length of coiled tubing 123/124 via a compression clamp 302. The compression claim 302 can encircle the outer surface of the first or second length of coiled tubing 123/124 and apply pressure 303 thereto. The compression clamp 302 may take any form, including but not limited to a manual or hydraulic clamping apparatus.

Figure 3C:
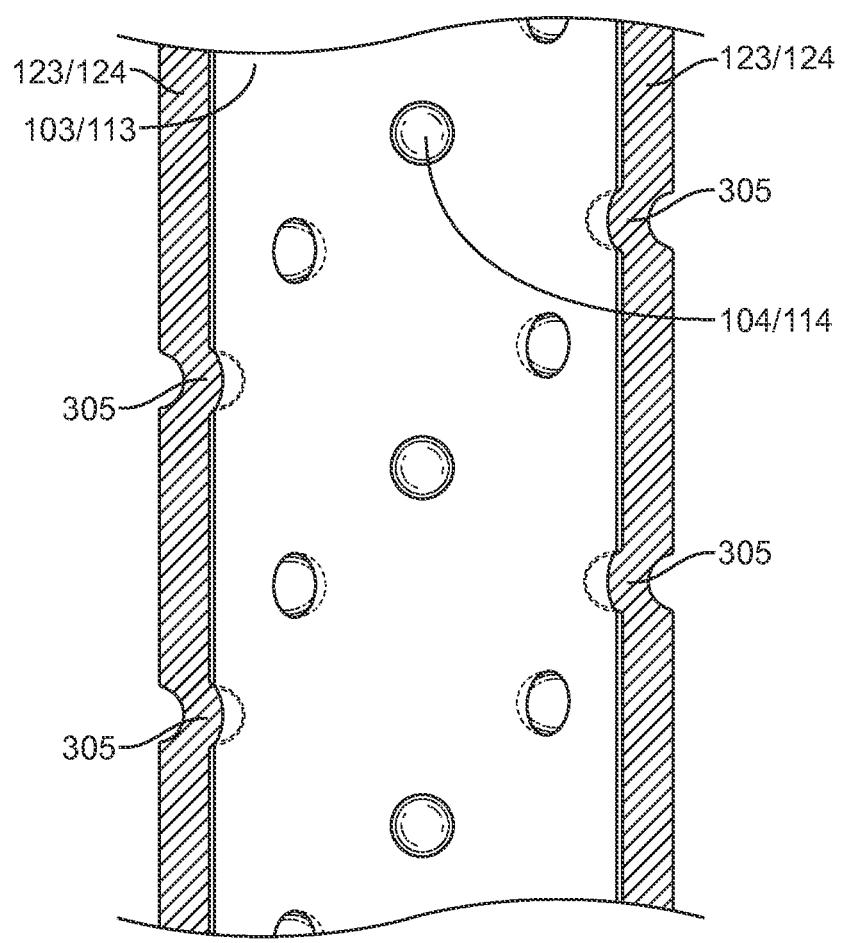

Referring to FIG. 3C, it can be seen that after applying pressure 303 with the compression clamp 302, the first or second length of coiled tubing 123/124 is deformed into the plurality of dimples 104/114 at a plurality of points 305.

Figure 3D:
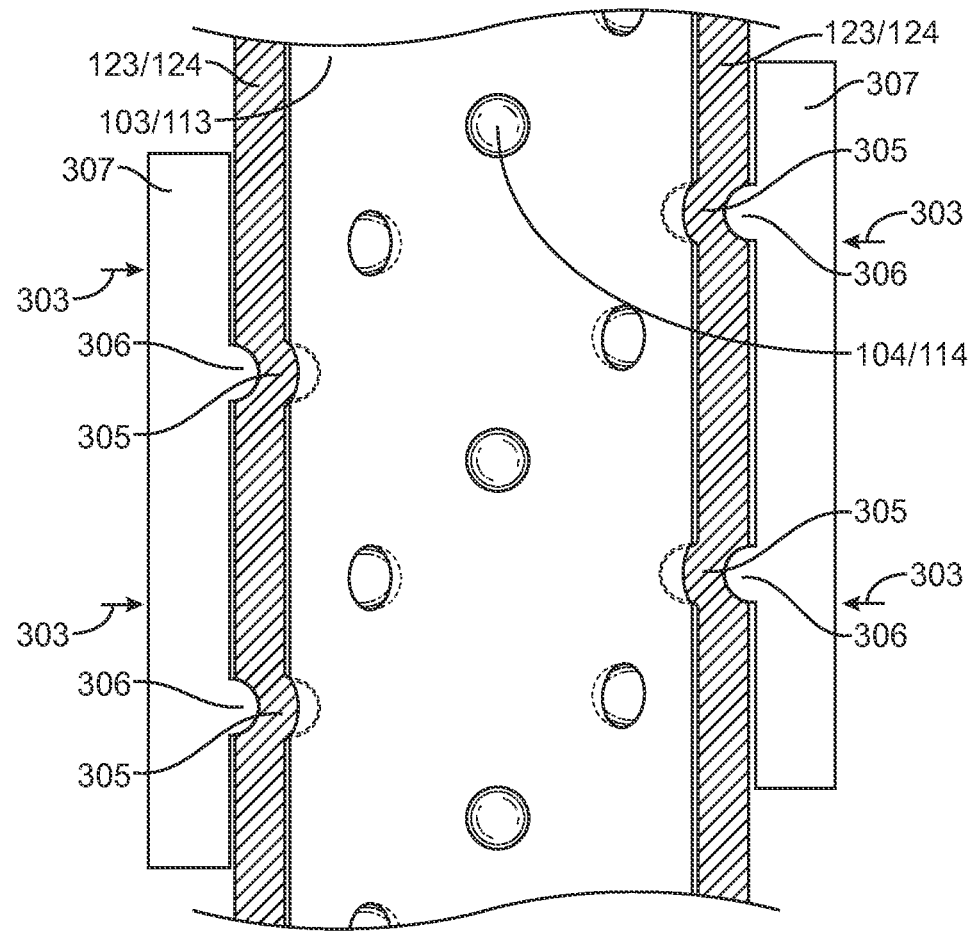

Referring to FIG. 3D, a second type of compression clamp 307 is illustrated, having integral negative-dimple-shaped elements 306. Just as in FIGS. 3A-C, the integral negative-dimple-shaped elements 306 deforms the first or second length of coiled tubing 123/124 into the plurality of dimples 104/114 at a plurality of points 305.

Figure 4:
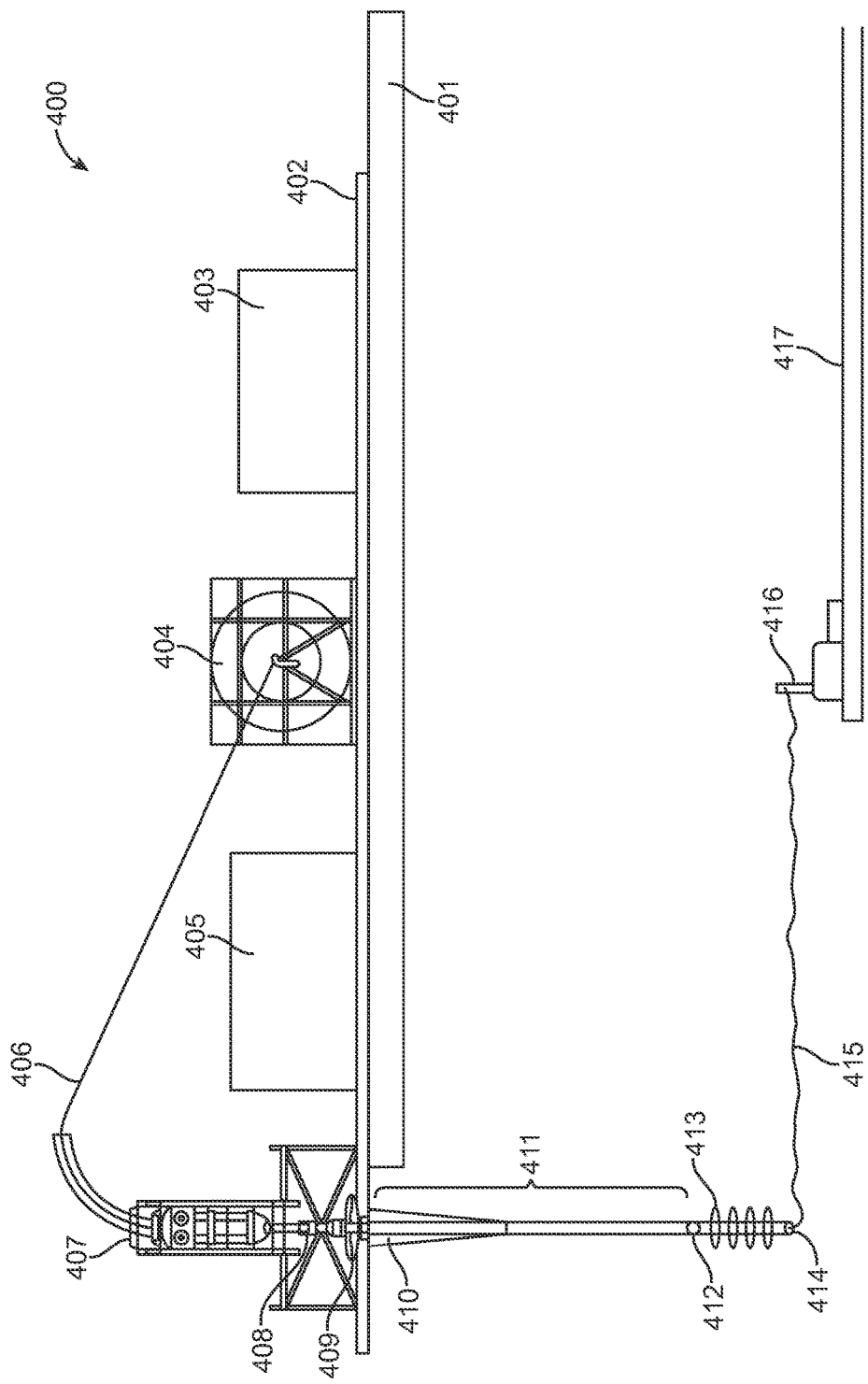
FIG. 4 is a schematic illustration of a system employing a spoolable swivel in a downline application from a floating vessel.

Referring to FIG. 4, a system 400 for providing a connection from a barge 401 to an underwater pipeline 417 or an underwater wellhead 416, the system may employ a spoolable swivel as described herein. The spoolable swivel may couple a first length of coiled tubing to a second length of coiled tubing, as already described.

The first length of coiled tubing may be disposed to be coupled to surface equipment, such as a barge 401 or equipment thereon. Coiled tubing 406 can be stored or supplied on a reel 404. The coiled tubing 406 can be fed onto an injector head 407, which can push the coiled tubing underwater. The coiled tubing can also be fed through a pipe cleaner 408, such as a PipeViper® commercial pipe cleaning system. The coiled tubing can also be fed through a surface cutter 409. The injector head 407 can be controlled from a control house 403 and powered by a power pack 405. The injector head 407, the power pack 405, the reel 404, and the control cabin 403 can all be supported on one or more support beams 402 on the barge 401. The entire system can, therefore, be modular and easily moved between different surface vessels.

Upon being injected by the injector head 407, the coiled tubing, which can include a spoolable swivel, can pass through a bend stiffener to provide structural support. The coiled tubing can be coupled via a connector 412 or 414 to a flying hose 415, which is in turn coupled to a well head 416 or to a pipeline 417. One or more weights 413 can be attached to the coiled tubing at a lower extent thereof to keep the outer tubular element in an approximately fixed position, while the inner tubular element is allowed to swivel, thereby reducing or eliminating torsional yaw forces on the coiled tubing and extending its service life. Of course, the spoolable swivel can also be oriented such that the outer tubular element is connected to the first length of coiled tubing and the inner tubular element is connected to the second length of coiled tubing. In such case, the one or more weights 413 can hold the inner tubular element in an approximately fixed position while the outer tubular element is allowed to swivel. One or more spoolable swivels can be incorporated into the coiled tubing anywhere along a swivel region 411, extending from the injector head 407 to the one or more weights 413.

The inner and outer diameters of the distal and proximal ends of the inner tubular element and the outer tubular element allow the spoolable swivel to be sized to have a low profile that provides a smooth outer surface with respect to the coiled tubing, as described herein, the spoolable swivel can pass through elements such as the bend stiffener 410, the injector head 407, and be wound onto the reel 404 without causing damage to these elements or to the coiled tubing.

Methods for providing a connection to an underwater pipeline 417 or wellhead 416 can include submerging a spoolable swivel as described herein coupling a first length of coiled tubing to a second length of coiled tubing. The second length of coiled tubing can then be coupled directly or indirectly to the underwater pipeline 417 or wellhead 416, for example via a flying hose 415. The systems and methods described herein can be useful in the portable pipeline systems (PPS) market in deepwater applications where standard hoses cannot withstand the hydrostatic pressures of deepwater operations. The systems and methods can also add a strategic advantage on the subsea well intervention market from vessels.

What is claimed is:

1. A spoolable swivel coupled with a first length of coiled tubing and a second length of coiled tubing, the spoolable swivel comprising:
   an inner tubular element having
      a first distal end having a first distal surface, the first distal end coupled with the first length of coiled tubing,
      a first plurality of dimples disposed on the first distal surface,
      a first proximal end having a first proximal surface, and
      a first race disposed on the first proximal surface; and
   an outer tubular element having
      a second proximal end having a second proximal surface,
      a second race disposed on the second proximal surface, and
      a second distal end having a second distal surface, the second distal end coupled with the second length of coiled tubing,
      a second plurality of dimples disposed on the second distal surface,
   wherein the first race aligns with the second race to define an annular void when the first proximal end of the inner tubular element is inserted into the second proximal end of the outer tubular element, and
   wherein a plurality of bearings are positioned within the annular void to provide a swiveling coupling between the inner tubular element and the outer tubular element.

2. The spoolable swivel according to claim 1, wherein the first length of coiled tubing is attached to the inner tubular element via the first plurality of dimples, and wherein the second length of coiled tubing is attached to the outer tubular element via the second plurality of dimples.

3. The spoolable swivel according to claim 1, further comprising at least one additional annular void defined by one or more additional races disposed on the first proximal and on the second proximal surface,
   wherein at least one additional plurality of bearings are positioned within the at least one additional annular void to provide the swiveling coupling between the inner tubular element and the outer tubular element.

4. The spoolable swivel according to claim 1, further comprising at least one annular lip seal disposed on the first distal surface of the inner tubular element.

5. The spoolable swivel according to claim 1, further comprising at least one ring seal disposed within the outer tubular element.

6. The spoolable swivel according to claim 1, wherein the inner tubular element comprises a material selected from the group consisting of a non-corrosive metal, a non-corrosive metal alloy, a rigid polymer material, and combinations thereof.

7. The spoolable swivel according to claim 1, wherein the outer tubular element comprises a material selected from the group consisting of a non-corrosive metal, a non-corrosive metal alloy, a rigid polymer material, and combinations thereof.

8. The spoolable swivel according to claim 1, wherein the plurality of bearings comprise a material selected from the group consisting of a non-corrosive metal, a non-corrosive metal alloy, a rigid polymer material, and combinations thereof.

9. The spoolable swivel according to claim 1,
   wherein the first distal end has
      a first distal inner diameter and
      a first distal outer diameter,
   wherein the first proximal end has
      a first proximal inner diameter and
      a first proximal outer diameter,
   wherein the second proximal end has
      a second proximal inner diameter and
      a second proximal outer diameter,
   wherein the second distal end has
      a second distal inner diameter and
      a second distal outer diameter,
   wherein the first distal inner diameter, the first proximal inner diameter, and the second distal inner diameter are approximately equal,
   wherein the first distal outer diameter, the first proximal outer diameter, the second proximal inner diameter, the second distal outer diameter are approximately equal.

10. The spoolable swivel according to claim 9, wherein a difference between the second proximal outer diameter and the first distal outer diameter is approximately equal to a thickness of the first length of coiled tubing.

11. The spoolable swivel according to claim 9, wherein a difference between the second proximal outer diameter and the second distal outer diameter is approximately equal to a thickness of the second length of coiled tubing.

12. The spoolable swivel according to claim 9, wherein a difference between the second proximal outer diameter and the second distal inner diameter is approximately equal to a thickness of the first proximal end of the inner tubular element.

13. A method for joining a first length of coiled tubing to a second length of coiled tubing, the method comprising:
disposing a spoolable swivel between the first length of coiled tubing and the second length of coiled tubing, wherein the spoolable swivel comprises:
an inner tubular element having
a first distal end having a first distal surface,
a first plurality of dimples disposed on the first distal surface,
a first proximal end having a first proximal surface, and
a first race disposed on the first proximal surface, and
an outer tubular element having
a second proximal end having a second proximal surface,
a second race disposed on the second proximal surface,
a second distal end having a second distal surface, and
a second plurality of dimples disposed on the second distal surface,
wherein the first race aligns with the second race to define an annular void when the first proximal end of the inner tubular element is inserted into the second proximal end of the outer tube,
wherein a plurality of bearings are positioned within the annular void to provide a swiveling coupling between the inner tubular element and the outer tubular element;
deforming the first length of coiled tubing into the first plurality of dimples at a first plurality of points along the first length of coiled tubing; and
deforming the second length of coiled tubing into the second plurality of dimples at a second plurality of points along the second length of coiled tubing.

14. The method according to claim 13,
wherein the first distal end has
a first distal inner diameter and
a first distal outer diameter,
wherein the first proximal end has
a first proximal inner diameter and
a first proximal outer diameter,
wherein the second proximal end has
a second proximal inner diameter and
a second proximal outer diameter,
wherein the second distal end has
a second distal inner diameter and
a second distal outer diameter,
wherein the first distal inner diameter, the first proximal inner diameter, and the second distal inner diameter are approximately equal,
wherein the first distal outer diameter, the first proximal outer diameter, the second proximal inner diameter, the second distal outer diameter are approximately equal.

15. The method according to claim 14, wherein a difference between the second proximal outer diameter and the first distal outer diameter is approximately equal to a thickness of the first length of coiled tubing.

16. The method according to claim 14, wherein a difference between the second proximal outer diameter and the second distal outer diameter is approximately equal to a thickness of the second length of coiled tubing.

17. The method according to claim 14, wherein a difference between the second proximal outer diameter and the second distal inner diameter is approximately equal to a thickness of the first proximal end of the inner tubular element.

18. A system for providing a connection to an underwater pipeline, the system comprising:
a spoolable swivel coupling a first length of coiled tubing to a second length of coiled tubing, wherein the spoolable swivel comprises:
an inner tubular element having
a first distal end having a first distal surface,
a first plurality of dimples disposed on the first distal surface,
a first proximal end having a first proximal surface, and
a first race disposed on the first proximal surface; and
an outer tubular element having
a second proximal end having a second proximal surface,
a second race disposed on the second proximal surface,
a second distal end having a second distal surface, and
a second plurality of dimples disposed on the second distal surface,
wherein the first race aligns with the second race to define an annular void when the first proximal end of the inner tubular element is inserted into the second proximal end of the outer tube, and
wherein a plurality of bearings are positioned within the annular void to provide a swiveling coupling between the inner tubular element and the outer tubular element;
wherein the first length of coiled tubing is deformed into the first plurality of dimples at a first plurality of points along the first length of coiled tubing; and
wherein the second length of coiled tubing is deformed into the second plurality of dimples at a second plurality of points along the second length of coiled tubing.

19. The system according to claim 18, wherein the first length of coiled tubing is disposed to be coupled to surface equipment,
wherein the second length of coiled tubing is disposed to be coupled to underwater equipment,
wherein the system further comprises at least one weight attached to the second length of coiled tubing.

20. A method for providing a connection to an underwater pipeline, the method comprising:
submerging a spoolable swivel coupling a first length of coiled tubing to a second length of coiled tubing, wherein the spoolable swivel comprises:
an inner tubular element having
a first distal end having a first distal surface,
a first plurality of dimples disposed on the first distal surface,
a first proximal end having a first proximal surface, and
a first race disposed on the first proximal surface, and
an outer tubular element having
a second proximal end having a second proximal surface,
a second race disposed on the second proximal surface,
a second distal end having a second distal surface, and
a second plurality of dimples disposed on the second distal surface,
wherein the first race aligns with the second race to define an annular void when the first proximal end of the inner tubular element is inserted into the second proximal end of the outer tube, and
wherein a plurality of bearings are positioned within the annular void to provide a swiveling coupling between the inner tubular element and the outer tubular element, wherein the first length of coiled tubing is deformed into the first plurality of dimples at a first plurality of points along the first length of coiled tubing, wherein the second length of coiled tubing is deformed into the second plurality of dimples at a second plurality of points along the second length of coiled tubing; and coupling the second length of coiled tubing to the underwater pipeline.

21. The method according to claim 20, wherein the system further comprises at least one weight attached to the second length of coiled tubing.

22. A spoolable swivel for coupling a first and second length of coiled tubing comprising:
an inner tubular element having
a first distal end having a first distal surface,
a first proximal end having a first proximal surface, and
a first race disposed on the first proximal surface; and
an outer tubular element having
a second proximal end having a second proximal surface,
a second race disposed on the second proximal surface, and
a second distal end having a second distal surface,
wherein the first race aligns with the second race to define an annular void when the first proximal end of the inner tubular element is inserted into the second proximal end of the outer tubular element,
wherein a plurality of bearings are positioned within the annular void to provide a swiveling coupling between the inner tubular element and the outer tubular element,
wherein the first distal end has
a first distal inner diameter and
a first distal outer diameter,
wherein the first proximal end has
a first proximal inner diameter and
a first proximal outer diameter,
wherein the second proximal end has
a second proximal inner diameter and
a second proximal outer diameter,
wherein the second distal end has
a second distal inner diameter and
a second distal outer diameter,
wherein the first distal inner diameter, the first proximal inner diameter, and the second distal inner diameter are approximately equal, and
wherein the first distal outer diameter, the first proximal outer diameter, the second proximal inner diameter, the second distal outer diameter are approximately equal.

23. The spoolable swivel according to claim 22, wherein a difference between the second proximal outer diameter and the first distal outer diameter is approximately equal to a thickness of the first length of coiled tubing.

24. The spoolable swivel according to claim 22, wherein a difference between the second proximal outer diameter and the second distal outer diameter is approximately equal to a thickness of the second length of coiled tubing.

25. The spoolable swivel according to claim 22, wherein a difference between the second proximal outer diameter and the second distal inner diameter is approximately equal to a thickness of the first proximal end of the inner tubular element.

* * * * *